(No Model.) 6 Sheets—Sheet 1.
J. H. MANNY.
APPARATUS FOR HEATING AND VENTILATING BUILDINGS.
No. 293,260. Patented Feb. 12, 1884.
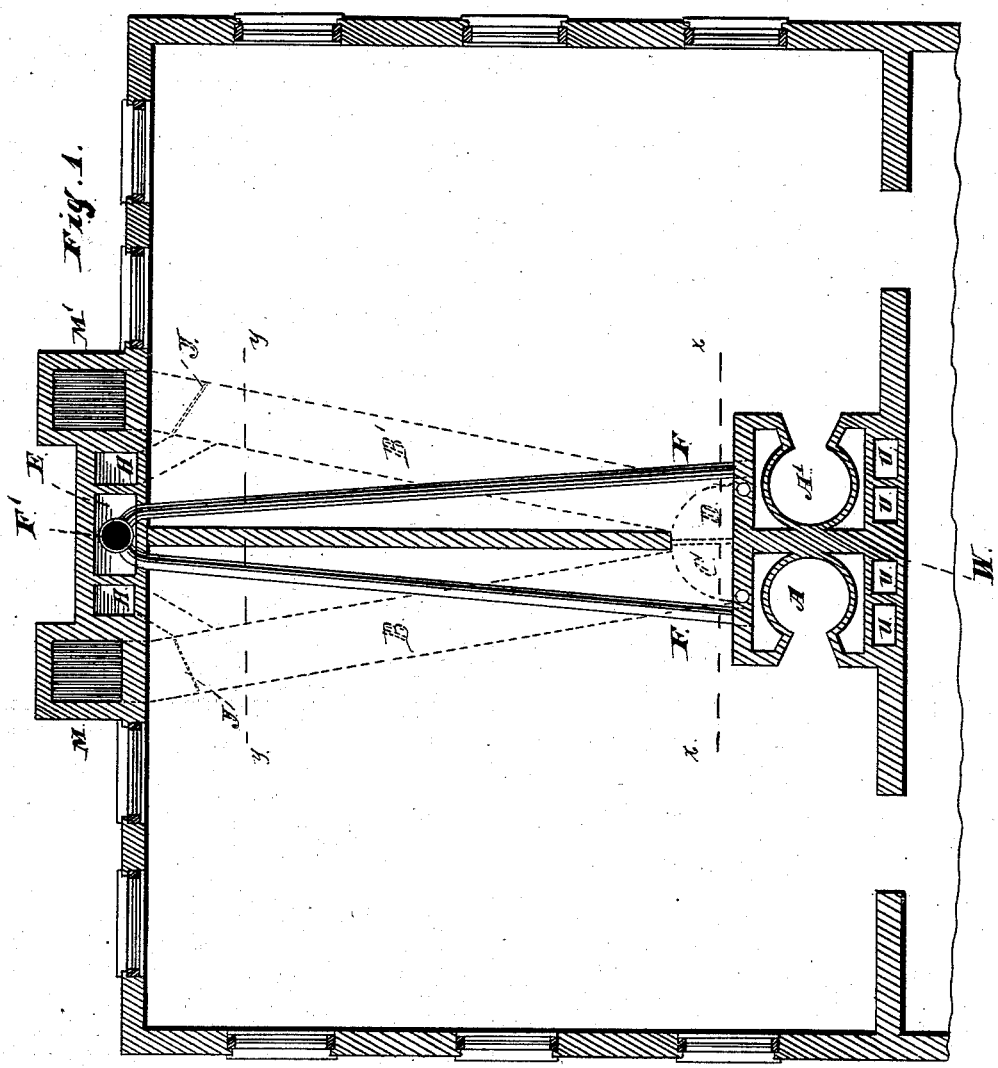

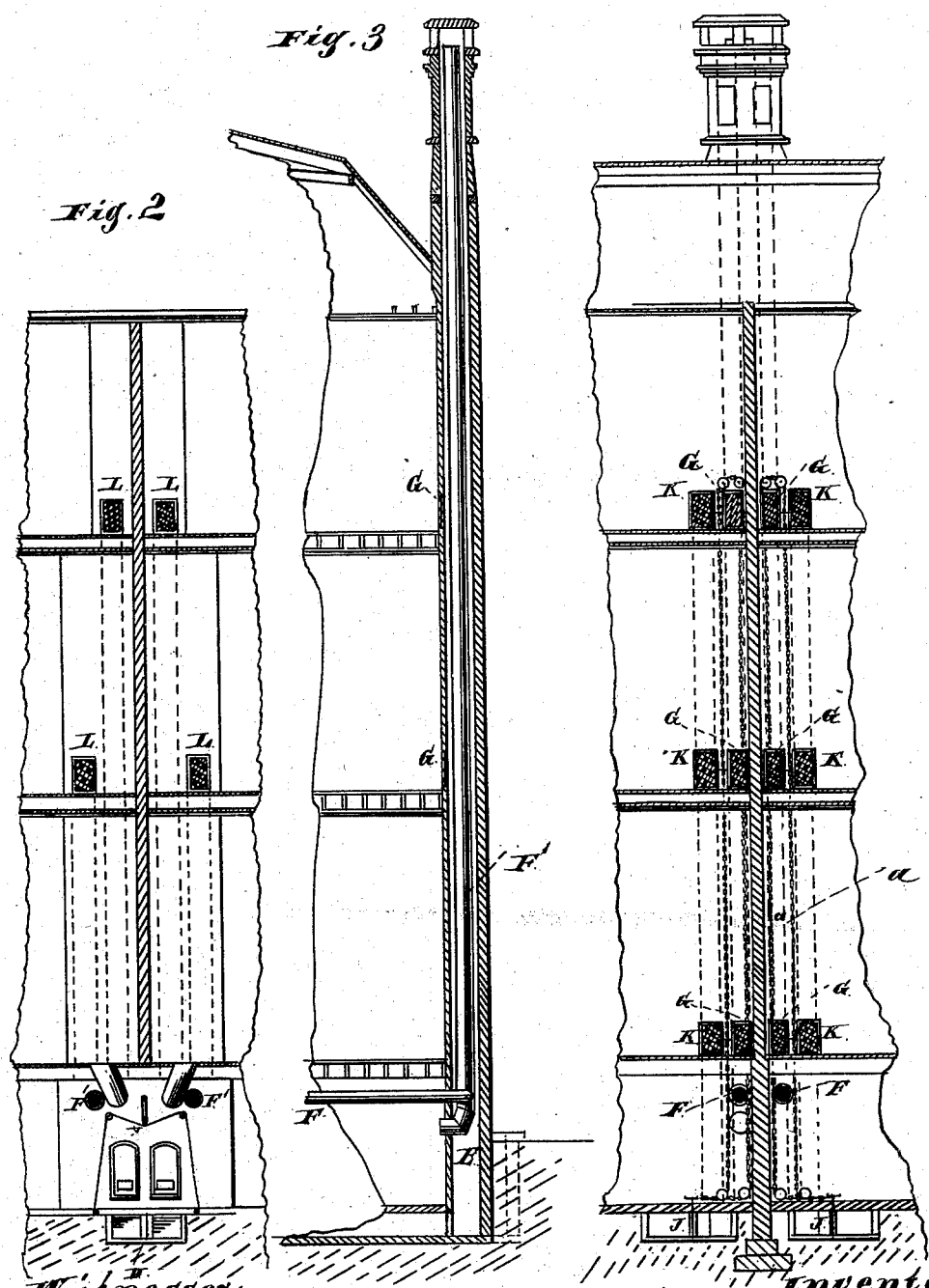

(No Model.)
J. H. MANNY.
APPARATUS FOR HEATING AND VENTILATING BUILDINGS.
No. 293,260. Patented Feb. 12, 1884.
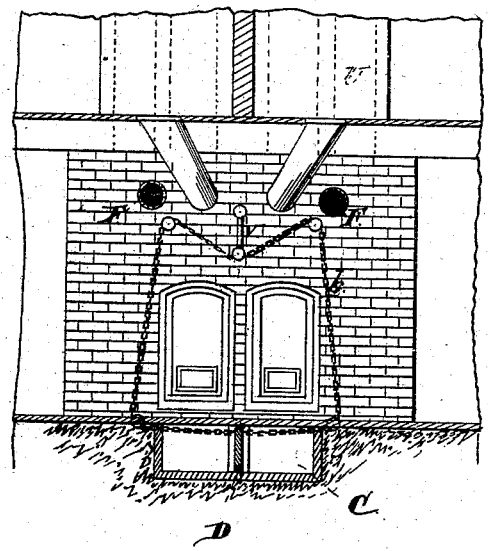
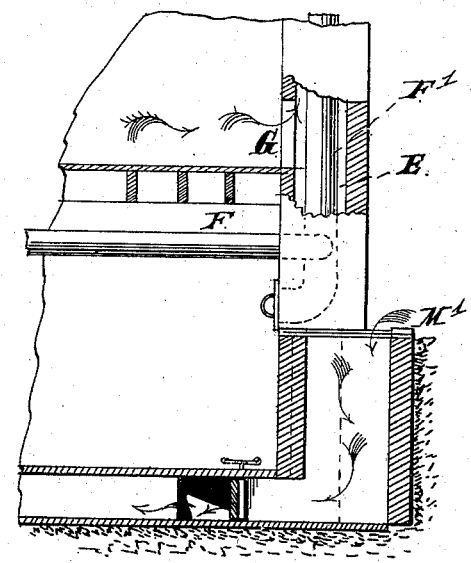
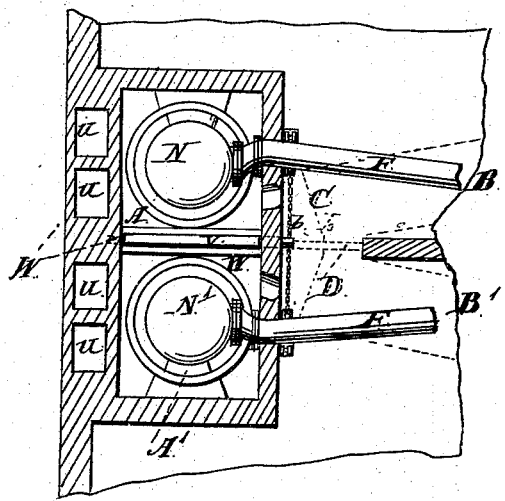
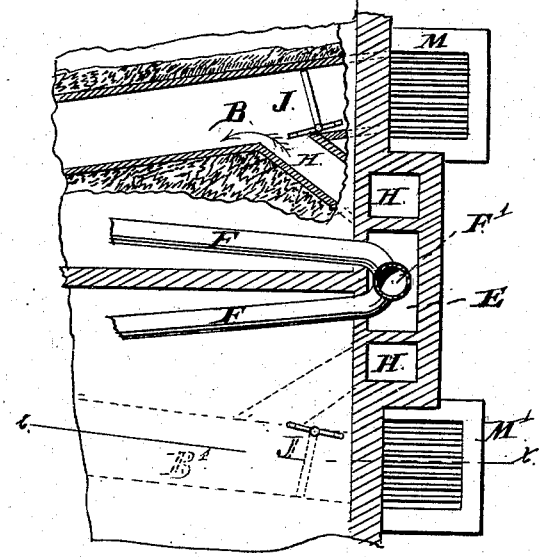
Witnesses:
Albert H. Adams.
O. W. Bond.
Inventor:
James H. Manny
By West & Bond Attys (No Model.) 6 Sheets—Sheet 4.
J. H. MANNY.
APPARATUS FOR HEATING AND VENTILATING BUILDINGS.
No. 293,260. Patented Feb. 12, 1884.
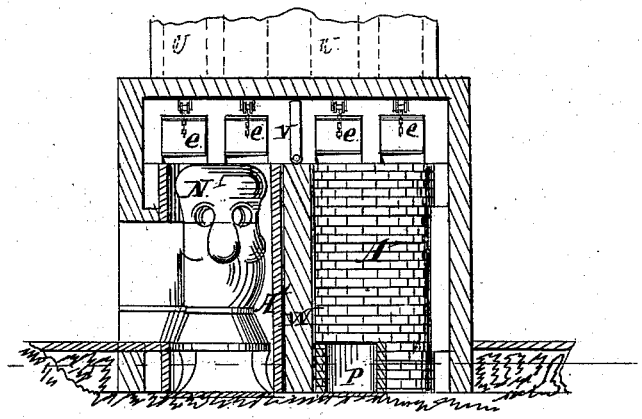
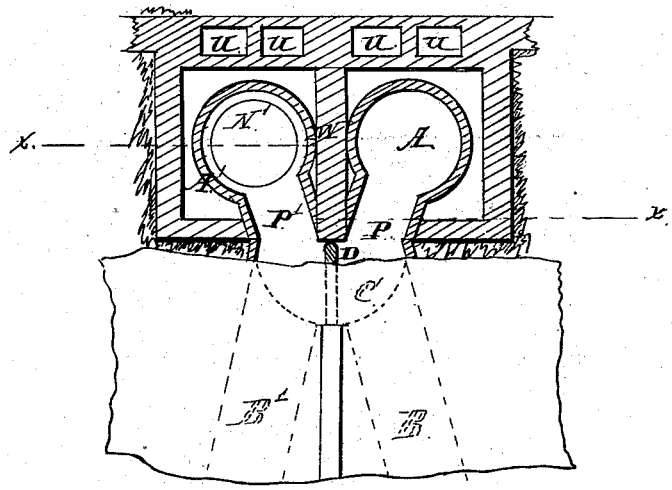
Witnesses:
Albert H. Adams
O. W. Bond
Inventor:
James H. Manny
By West & Bond Attys

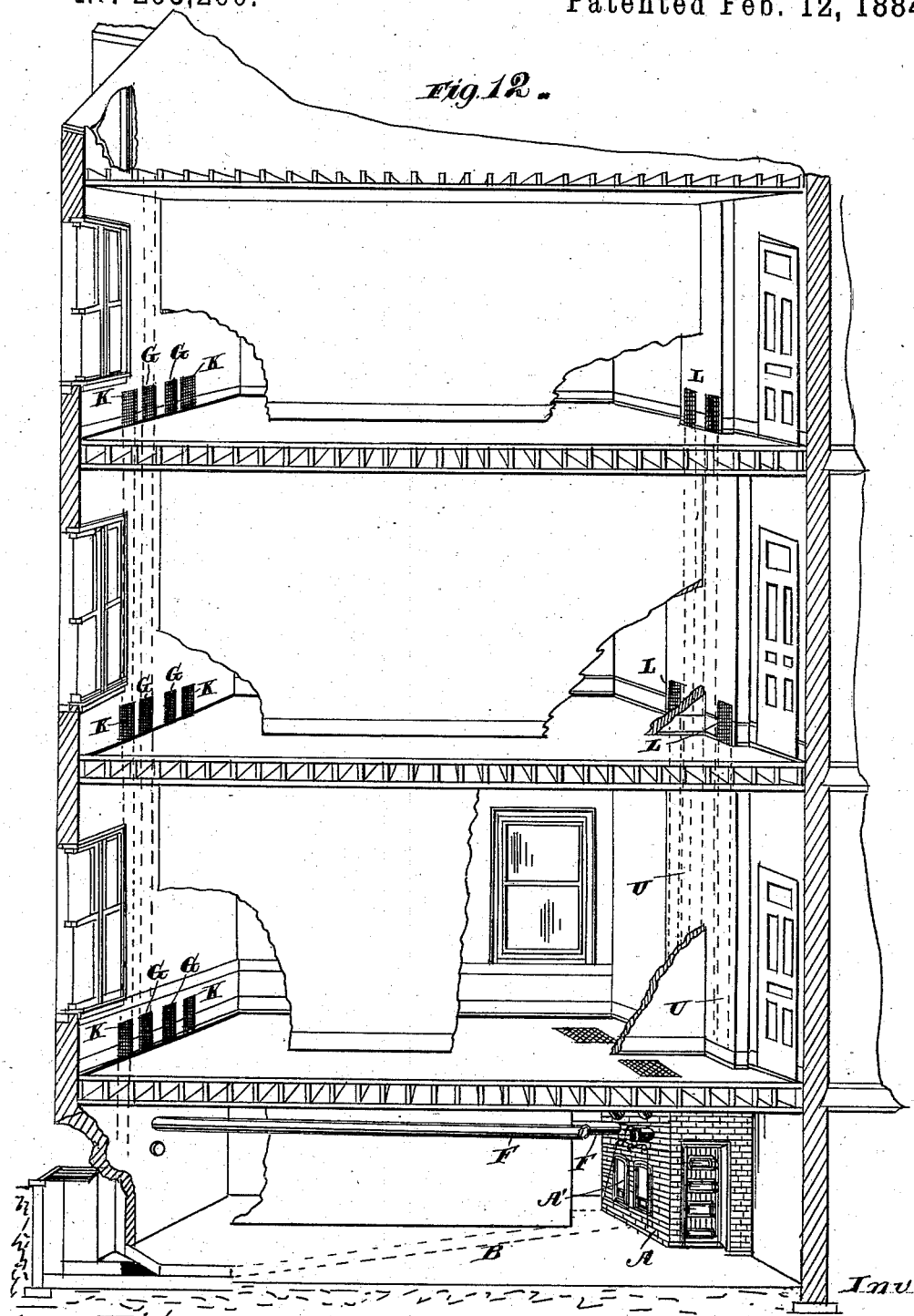

(No Model.)  6 Sheets—Sheet 6.
J. H. MANNY.
APPARATUS FOR HEATING AND VENTILATING BUILDINGS.
No. 293,260.  Patented Feb. 12, 1884.
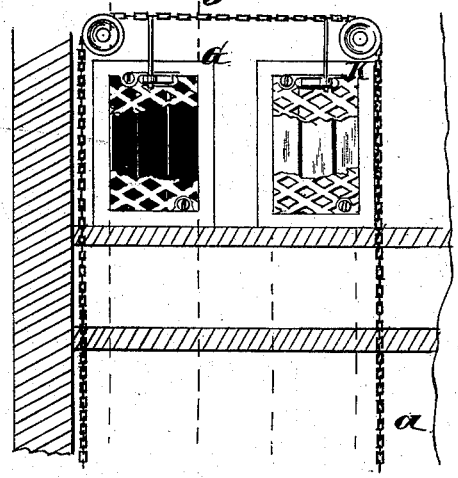
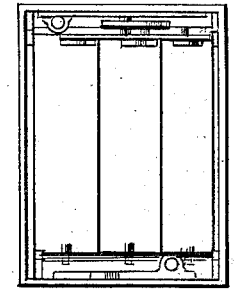
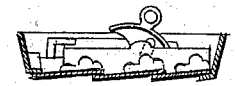
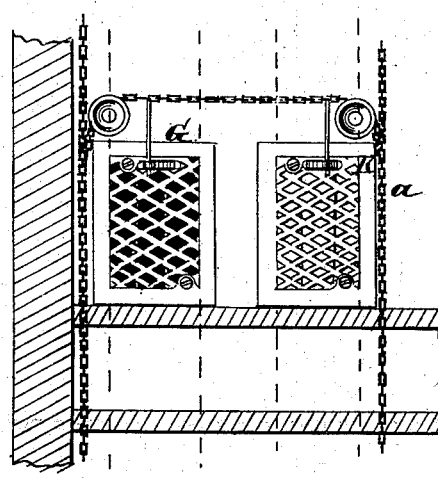
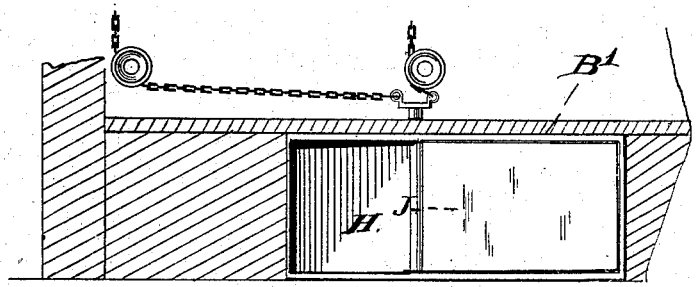
Witnesses:
B. A. Price
Albert H. Adams
Inventor:
James H. Manny
By West & Bond Attys

UNITED STATES PATENT OFFICE.

JAMES H. MANNY, OF CHICAGO, ILLINOIS, ASSIGNOR TO THE RICHARDSON & BOYNTON COMPANY, OF NEW YORK.

APPARATUS FOR HEATING AND VENTILATING BUILDINGS.

SPECIFICATION forming part of Letters Patent No. 293,260, dated February 12, 1884.

Application filed July 23, 1881. (No model.)

*To all whom it may concern:*

Be it known that I, JAMES H. MANNY, residing at Chicago, in the county of Cook and State of Illinois, and a citizen of the United States, have invented new and useful Improvements in Apparatus for Heating and Ventilating Buildings, of which the following is a full description, reference being had to the accompanying drawings, in which—
Figure 1 is a plan. Fig. 2 is a section at line $x$ of Fig. 1, looking toward the furnaces, and at that side of the room in which the hot-air flues are placed. Fig. 3 is a vertical cross-section through the ventilating-flue, showing the main smoke-pipe in such flue. Fig. 4 is a section at line $y$ of Fig. 1, showing that wall of the building opposite to that shown in Fig. 2. Fig. 5 is the same as the lower part of Fig. 2, enlarged, showing in elevation one side of the two furnace-chambers, with the chain which operates the valves D and V. Fig. 6 is an enlarged detail, showing, among other things, smoke-pipes extending to the furnaces. Fig. 7 is an enlarged detail, being chiefly a horizontal section of the parts shown, showing the connection of the circulating-passages with the cold-air flues. Fig. 8 is a vertical section at line $x$ of Fig. 7. Fig. 9 is a vertical section through the furnace-chambers, with a furnace in one only of such chambers, at line $x$, Fig. 10. Fig. 10 is a detail, being a horizontal section showing the air-ducts leading to the furnace-chambers. Fig. 11 is a detail, showing how the endless chain $a$, which is connected with the registers G, operates the valves J. Fig. 12 is a vertical sectional view of a building showing my invention applied thereto. Fig. 13 is a vertical section taken on the right-hand half of Fig. 4, and illustrating, on an enlarged scale, the two registers and means for simultaneously operating the same. Fig. 14 is a side view of one of the ventilators enlarged, and Fig. 15 is a cross-section thereof.

The object of my invention is to provide improved devices to be used in heating and ventilating large buildings. In cold weather much more heat is required than in mild weather. I therefore provide two furnaces combined with cold-air ducts in such manner that the cold air can be admitted to both or to only one of such furnaces, as may be desired. I also provide a hot-air chamber in connection with said two furnaces, having a valve, so constructed that either furnace may be used for supplying heat to the entire building, if desired, or for supplying heat to a portion only of the rooms of the building, if desired. I also operate the valve controlling the admission of air to the furnace-chambers and the valve in the hot-air chamber simultaneously. I further provide an air-passage from each room, which communicates with the cold-air duct, which passage and duct are provided with a valve so arranged that the air to the furnace-chambers can be supplied from the rooms, instead of from outside the building, if desired. I also connect the registers through which air passes into the ventilating-duct and the registers controlling the passage from each room to the cold-air duct and a valve in the cold-air duct in such manner that they can all be operated simultaneously, all as hereinafter fully described.

In the drawings, A A' represent two furnace-chambers, within each of which is to be placed a furnace of any suitable construction. In some of the figures the furnaces are not represented at all, and in some of them a furnace is shown in one of the chambers only.

N N', Fig. 6, represent two furnaces, one in each of the furnace-chambers A A'. In Fig. 9 one furnace is shown, and in Fig. 10 the same furnace is indicated.

B B' are two cold-air ducts leading from the outside of the building to a small chamber, C, which chamber communicates with both of the furnace-chambers by means of passages P P', Fig. 10. In this chamber C is a valve, D, so arranged that it can be used to divide the chamber C into two parts, directing the cold air from the duct B to the furnace-chamber A and the cold air from the duct B' to the furnace-chamber A'. Said valve can also be used to close the passage from the chamber C to either of the furnace-chambers, so that the cold air from both ducts B B' will pass to either of the furnace-chambers at pleasure. There is a wall, W, between the two hot-air chambers A A', but this wall does not extend to the top of these chambers; and there is a valve, V, at the top of this wall, which wall and valve, when the valve is closed, separate the furnace-chambers from each other, so that then each furnace has a separate hot-air chamber; but when the valve is open there is a common hot-air chamber for both furnaces. The hot air is conveyed from the furnace-chambers to the rooms through flues U and passages in the usual manner.

E is a ventilating-shaft.

F are smoke-pipes leading from the furnaces to a common smoke-pipe, F', located in the ventilating-shaft E.

G are ventilating-registers, one for each room, controlling the passage of air from the rooms to the shaft E.

H are passages, one for each room, leading to and opening into one of the cold-air ducts B B'. The passages H open, respectively, into the cold-air ducts B B', (see Fig. 7,) and at the point of junction of the passages and ducts are located pivoted valves J, which are capable of being turned so that the air-ducts B B' and passages H communicate with each other, and the air will then constantly pass from the rooms through the passages H to the cold-air ducts, or such valves can be turned to cut off communication between the passages H and said ducts. The ventilating-registers G, which control the passage of air to the ventilating-shaft E, are in the several rooms over each other and are connected with each other, and also with one of the valves J by means of a single chain, a, so that they can all be closed or opened together. This chain passes over the pulleys at the top and bottom.

K are registers over the openings through which cold air passes from the several rooms into the circulation-ducts H. These registers are also operated by the chain a, as shown in Fig. 13; but if not connected with such chain the passage of air from the rooms to the cold-air duct can be controlled by the valves J. The slats of the ventilator K are vertical, as usual, and are arranged to move in a direction opposite to the direction in which the slats in G move, so that one closes while the other opens.

L are registers which control the admission of hot air to the several rooms.

e are valves which control the passage of hot air from the furnace-chambers. They can be operated in any suitable manner. As shown, cold air from without is supplied to the furnace-chambers through the openings M M', which communicate respectively with the passages B B'.

v, Fig. 5, is a crank connected to the valve V. b is a chain connected with the crank v. This chain is also connected with the valve D which controls the air-inlets to the furnace-chambers, so that both of these valves V D can be operated simultaneously, as shown in Figs. 5 and 6.

In Figs. 1 and 10 the position of the chamber C and the valve D is shown in dotted lines.

In Fig. 5 the valve D is shown in the proper position to send cold air from the passage B to the furnace-chamber A, and from B' to the furnace-chamber A'. This valve D is indicated in the same position by dotted lines in Figs. 1, 6, and 10.

In Fig. 7 the valves J are represented as closing the outside cold-air inlets, the passages H being open and allowing cold air to pass from the rooms to the furnace-chambers through B B'.

The operation is as follows: If the valve V be closed and the valve D be arranged in the middle of the chamber C, as shown in Fig. 5, and the valve J be arranged so as to close the passages H, opening into the cold-air ducts, cold air will pass from outside the building to each of the furnace-chambers, and hot air will be supplied from each furnace-chamber to that part of the building with which the hot-air flues leading therefrom communicate. At the same time the ventilating-registers G will be open, permitting the escape of the foul air from the rooms to the outside of the building up through the ventilating-shaft. When heating the building while the rooms are unoccupied, the ventilating-registers G may be closed, and the valves J may be arranged so that the passages H, opening into the outside cold-air ducts, will be opened, and these cold-air ducts will be closed by these valves J. Then cold air cannot pass from outside to the furnace-chambers, but air will be supplied to such chambers from the rooms through the circulation-passages H and ducts B B'. This arrangement of the registers G and valve J can be simultaneously effected by means of a single chain, as before stated. When the rooms are occupied the registers G can be opened, and the valves J also, to admit cold air from outside, and the passages H may be closed. In mild weather the valve D may be arranged so as to close the cold-air opening to one of the furnace-chambers, and at the same time the valve V may be opened, so that there will be but a single large hot-air chamber. This arrangement will be used when only one furnace is in use, and then the hot air from this one furnace will pass through the proper flues to all the rooms with which the hot-air pipes from the two furnace-chambers are connected.

There are many advantages resulting from the construction described, among which I will mention the following: It is much easier to control the temperature, as may be required, for cold or mild weather when two furnaces are used than when only a single furnace is used, as with my construction either furnace may be used for heating the whole building, or by a single change of the position of certain valves each of the furnaces will supply heat to only a part of the building. If the ventilating-registers G be open while the building is being heated before being occupied, there will be a constant escape of warm air from each room, causing a great loss of heat and requiring much more time to bring the rooms to the proper temperature. By closing these registers G and arranging the valves J so that they close the outside cold-air ducts, as before described, the cold air from the several rooms can be drawn to the furnace-chambers, and the building will be much sooner heated. By operating the registers G and the valves J together there will be no danger of mistakes, as there might be if they were separately operated.

What I claim as new, and desire to secure by Letters Patent, is as follows:

1. The two furnace-chambers A A', for containing furnaces, and provided with a valve, V, for opening and closing communication between the chambers, in combination with ducts arranged to supply cold air either to both or to one of the said chambers, whereby the furnaces can be used together, each heating a separate part of a building, or either of the furnaces can be used alone for heating the whole building, substantially as and for the purposes specified.

2. The circulating-passages H, one connecting with each room, in combination with separate cold-air ducts B B', opening, respectively, into the passages, and valves J, arranged, respectively, at the junction of the passages and ducts and capable of adjustment to establish communication between the said passages and ducts and cause the air from the rooms to flow through the cold-air ducts, substantially as described.

3. The combination of the ventilating-registers G, the circulation-passages H, and valves J, controlling both the cold-air ducts and the passages H, all adapted to be operated simultaneously, substantially as and for the purposes specified.

4. A valve, V, and a valve, D, controlling the air-inlets to the furnace-chambers, said valves being connected together, so as to be simultaneously operated, in combination with two furnace-chambers, A A', and air-ducts B B', substantially as and for the purposes specified.

JAMES H. MANNY.

Witnesses:
B. A. PRICE.
ALBERT H. ADAMS.